United States Patent [19]
Van Zeeland

[11] Patent Number: 5,523,730
[45] Date of Patent: Jun. 4, 1996

[54] SWITCH WITH MANGNETICALLY-COUPLED ARMATURE

[76] Inventor: Anthony J. Van Zeeland, 2140 S. Rogers, Mesa, Ariz. 85202

[21] Appl. No.: 458,989

[22] Filed: Jun. 2, 1995

[51] Int. Cl.⁶ .................................................. H01H 9/00
[52] U.S. Cl. ........................... 335/205; 335/177; 335/207
[58] Field of Search ........................... 335/205–7, 78–86, 335/177–179

[56] References Cited

U.S. PATENT DOCUMENTS

| | | | |
|---|---|---|---|
| 3,735,300 | 5/1973 | Benner et al. | 335/206 |
| 3,859,612 | 1/1975 | Kashio | 33/205 |
| 4,086,202 | 1/1978 | Lyons, III | 335/207 |
| 4,101,857 | 7/1978 | O'Toole | 335/206 |

*Primary Examiner*—Lincoln Donovan
*Attorney, Agent, or Firm*—Dorn, McEachran, Jambor & Keating

[57] ABSTRACT

A switch has a carrier sheet with electrodes formed on an internal side thereof to form switch contacts. An armature is held in slidable contact with the internal side of the carrier and the electrodes by a magnet disposed on the external surface of the carrier. The magnet is carried in a knob mounted on the external side of the membrane carrier for rotary, linear or complex motion. When a user manipulates the knob the magnet drags the armature either into or out of shorting relation with the electrodes. A magnetic detent gear can be incorporated to provide tactile feedback. A pushbutton version of the switch can be made with a pivotable armature normally held spaced from electrodes on the substrate by a magnet. A membrane and spacer may be added to protect and seal the electrodes and armature.

20 Claims, 7 Drawing Sheets

SWITCH WITH MANGNETICALLY-COUPLED ARMATURE

BACKGROUND OF THE INVENTION

Membrane switches are well known for providing electrical switching functions in a reliable, compact package. Membrane switches typically have a flexible plastic membrane layer normally separated from a substrate by a non-conductive spacer. Openings in the spacer permit a user to push the membrane through the spacer, bringing facing electrical contacts on the internal surfaces of the membrane and substrate into contact with one another, thereby closing a switch. The natural resilience of the membrane returns the membrane to its spaced position upon removal of the actuating force.

While this basic membrane switch construction has many advantages, it does not provide some features desirable in certain applications. For example, in some instances switch users are so accustomed to manipulating a particular type of mechanical actuator that they become confused by and consequently resistant to a membrane switch. The membrane switch is often a flat panel with graphical elements indicating where to press but having no protruding actuating member. Although membrane switches provide perfectly adequate electrical switching, manufacturers have found that users expecting to find a rotary switch or a slide switch or a pushbutton switch for a certain function don't take kindly to having the familiar switch replaced with a flat panel membrane switch. This is especially true with consumer products. Also, in automotive applications it can be important to provide a rotary or slide switch that a driver can find and manipulate with one hand while not diverting his or her attention from the road.

Another ongoing problem in membrane switches has been providing feedback to a user of switch actuation. Since the membrane travel to closure is very small most users cannot tell when they have actuated a switch unless there is something to indicate to them that closure has occurred. Aural feedback is common but not always desirable. Tactile feedback has been provided by clicker domes built into the membrane. In full travel keyboards feedback has been provided by a plastic actuator mounted above the membrane switch panel. Such actuators are usually complicated little devices which makes them relatively expensive.

SUMMARY OF THE INVENTION

The present invention concerns incorporating rotary, pushbutton and slide switches or potentiometers into a flat panel switch. This combines the benefits of membrane switches with the look and feel users are accustomed to with traditional switches.

The rotary and slide switches have a knob mounted on a carrier sheet for rotary, linear or complex motion. The knob carries a magnet for movement therewith adjacent the external surface of the carrier. Electrodes including at least one pair of spaced switch contacts are formed on the underside of the carrier. An armature is made of electrically conductive and magnetic material. By magnetic material it is meant that the material is affected by a magnet. The magnet holds the armature up against the underside of the carrier and, accordingly, against the electrodes. Movement of the knob drags the armature into and out of shorting relation with the switch contacts. The armature can be a flat, disc-shaped element. Alternately, it can be cylindrical or spherical. A detent gear can be used to provide tactile feedback of movement into and out of switch closure. Preferably some sort of substrate is used to protect and seal the electrodes and armature. A spacer with an opening in which the armature is disposed permits movement of the armature.

The rotary and slide switches of the present invention offer numerous advantages. The switches can be integrated into flat, continuous switch panels. Sealing integrity of the flat panels can be maintained since the switch contacts are located inside the switch. Seals rings can be readily employed to seal against dirt, dust and liquids. The knobs can be adhesively bonded to the front surface of a switch panel without the need to penetrate the continuously sealed surface. Off-center magnets can be employed to cause the armature to rotate during actuation thereby extending life. A virtually wear-proof magnetic detent can be added. Motor drives and magnetic clutches can be provided for applications such as washer timer controls. Integral membrane switch panels can be provided with pushbutton membrane switches, slide switches and rotary switches, or potentiometers, all integrated into one continuous panel. Low cost silver conductors can be used as switch contacts. Etched copper contacts can be provided for high current applications. Tactile feedback can be provided. The switches can be made as discrete, stand-alone components. High temperature membrane materials can be employed for high temperature applications, including high temperature processing such as wave soldering. Low cost polyester membranes can be employed as a carrier sheet or a printed circuit board could be used in place of a membrane or substrate.

The pushbutton switch has a layer of magnetic material between a spacer and a membrane. An armature in the spacer opening is pivotable between a normal position, in which it is spaced from electrodes on the substrate, and a closed position, in which it shorts the electrodes. The armature is held in its normal position by the magnetic attraction between the magnetic layer and the armature. When a user depresses the membrane the armature suddenly snaps free of the magnetic layer and closes against the electrodes, providing a switch closure and tactile feedback thereof. Removal of the closing pressure allows the magnetic layer to retract the armature and re-open the switch. A fulcrum built into one end of the armature assists the pivoting motion of the armature.

DETAILED DESCRIPTION OF THE INVENTION

Figure 1:
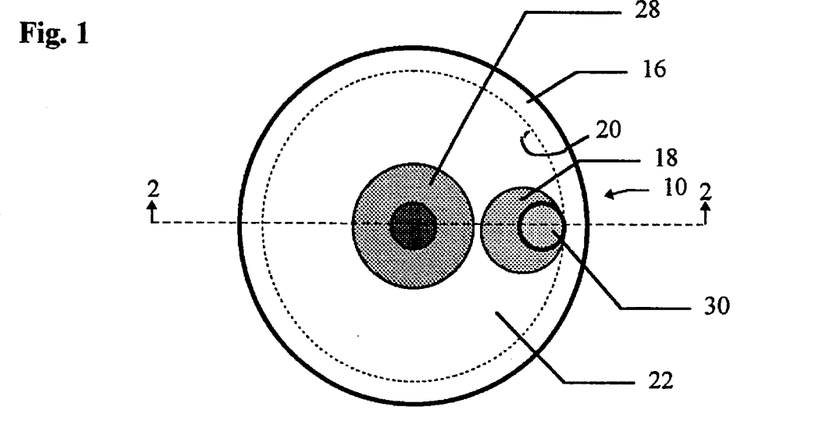
FIG. 1 is a plan view of the rotary switch according to the present invention.
Figure 2:
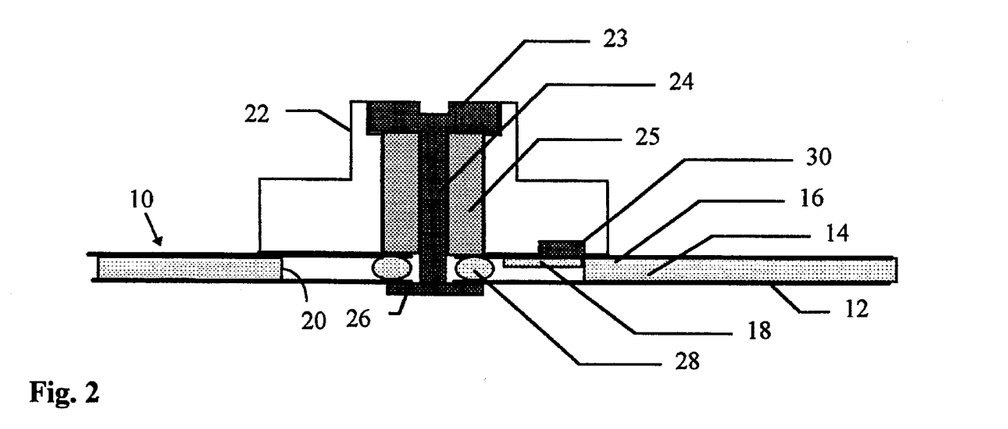
FIG. 2 is a section taken along line 2—2 of FIG. 1.

FIGS. 1 and 2 illustrate a rotary switch according to the present invention. The switch shown generally at 10 includes a substrate layer 12, a non-conductive spacer 14 and a carrier in the form of a membrane layer 16. Although not shown, it will be understood that the internal surface of the membrane carries a set of electrodes which define the spaced contacts of at least one electrical switch. The electrodes are conventionally formed either by screen printing or etching in copper. These contacts are configured in such a manner as to allow at least two contacts to be shorted together by a metallic armature 18. The armature is made of an electrically conductive magnetic material. One example would be soft steel plated with silver. The silver is added to enhance electrical conductivity and resist oxidation. A harder material such as rhodium could be added to improve wear resistance. An opening 20 in the spacer receives the armature 18. In this embodiment the armature is a flat, circular disc.

An actuating knob 22 is mounted for rotation on the switch by a bolt. The bolt has a head 23 and a shaft 24 extending through the membrane, spacer opening and substrate. A sleeve 25 surrounds the shaft above the membrane. A nut 26 holds the bolt in place. A seal ring 28 prevents entry of dirt, dust or moisture into the spacer opening. The nut 26 is tightened on shaft 24 to compress the seal ring 28 and sleeve 25 slightly. The actuating knob has a central bore that is large enough to permit rotation of the knob on the sleeve. The bolt head 23 prevents the knob from coming off the switch. The nut is shown as a separate part but alternately its function could be served by a drilled and tapped enlarged portion of the substrate. In a further alternate construction the sleeve 25 could be adhesively bonded to the top of the membrane. In that case the nut would not be needed and the shaft of the bolt would stop short of the membrane.

The knob 22 carries a coupler 30 in its underside. The coupler is a magnet which may be molded or otherwise entrapped in the knob. Where magnetic interference with other electronic components is a concern, the coupler may be shielded as needed. The coupler 30 forces the armature 18 against the internal surface of the membrane by means of the magnetic field originating from the coupler. The coupler functions both to create the switch contact pressure as well as to drag the armature 18 from one contact to another when a user rotates the knob 22.

It will be understood that the knob could be either in or out of contact with the external surface of the membrane. Likewise the magnet may or may not contact the membrane's external surface. Contact, or lack or it, between the knob or magnet and the membrane is not critical so long as the magnet is close enough to the armature to maintain coupling of the magnet and armature, i.e., the armature always moves with the magnet.

Operation of the switch is as follows. When a user grasps and turns the knob 22 the coupler 30 rotates with the knob. By virtue of the magnetic coupling between the coupler 30 and the armature 18, the armature rotates with the knob. As it rotates the armature moves into shorting contact with the contacts on the membrane, thereby closing the switch. Further rotation will move the armature out of contact with one or both electrodes to open the switch. Obviously, more than one set of switch contacts may be placed under the rotational area of a single knob, providing a plurality of switches under one knob. For example, the space traversed by the armature as it rotates with the coupler defines a ring. Toward the inside diameter of that ring may be a circular common contact. Toward the outside diameter of the ring may be a plurality of exterior electrodes terminating at a point inside the ring but spaced from each other and the common contact. The armature is always in contact with the common contact but moves into and out of contact with the exterior contacts. Or the circular common contact could be a split ring or the like. Numerous variations are possible.

Figure 3:
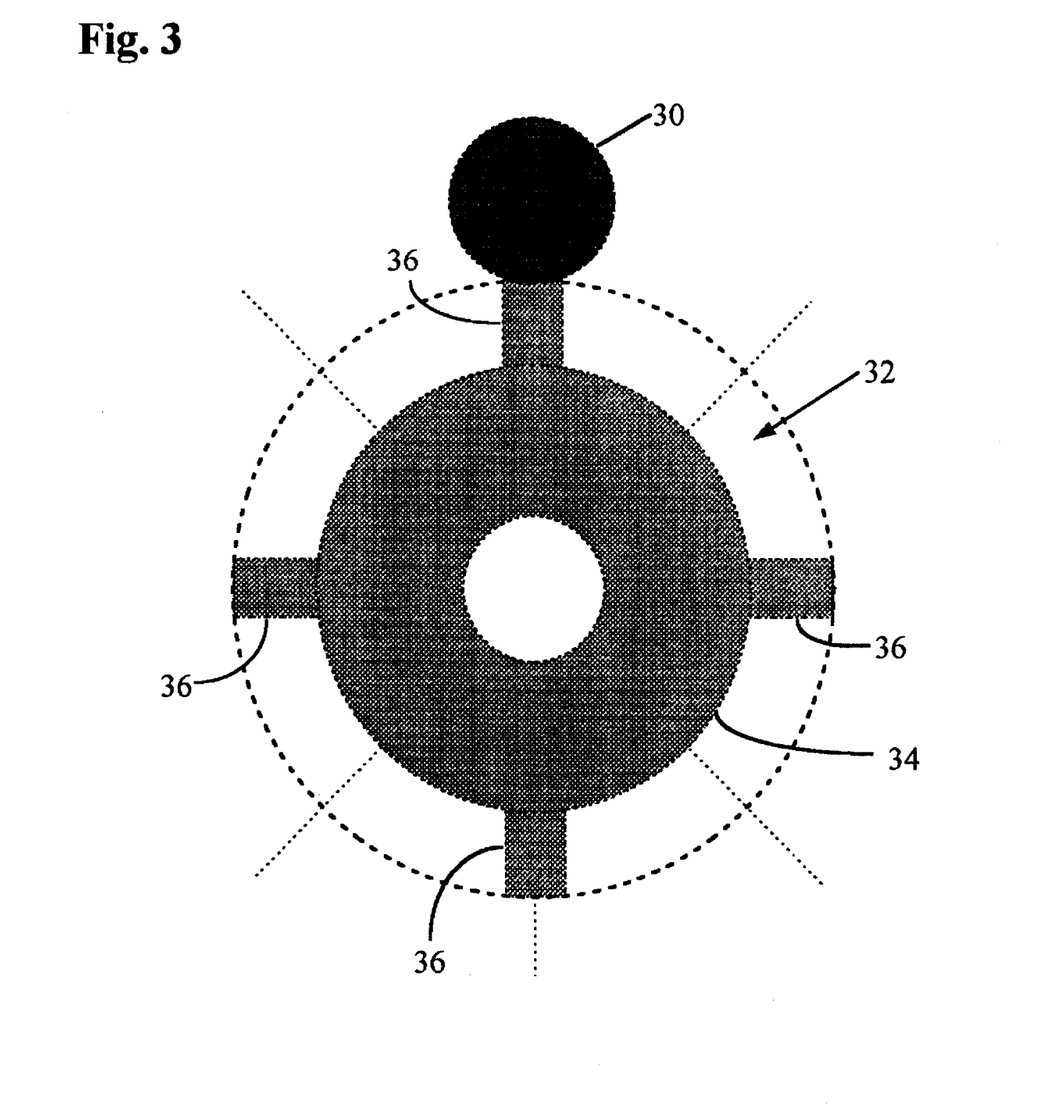
FIG. 3 is a schematic plan view of one form of detent mechanism for a rotary switch.

FIG. 3 illustrates a digital gear 32 which may optionally be incorporated in the rotary switch 10. The gear has a hub 34 with a plurality of cogs 36. Four cogs are shown but any number could be included as space permits, the dashed, diagonal lines in FIG. 3 indicating possible additional cog locations. The gear would be located on the external surface of the membrane 16, with the hub 34 surrounding the shaft 24 and the sleeve 25 sitting on top of the gear. The sleeve in this case would be shortened by the thickness of the gear 32. The underside of the knob 22 would also be cut out to accommodate the gear. The gear does not rotate with the knob but instead remains in a fixed position since it is compressed between the sleeve 25 and membrane 16. The cogs extend to the inside diameter of the circle described by the rotation of the coupler 30. The gear is made of magnetic material so that as the knob rotates the coupler into alignment with a cog the magnetic attraction between the coupler and cog creates a tactile sensation to the user. Alternately, a second magnet carried by the knob could be used in cooperation with the digital gear to provide tactile feedback.

Figure 4:
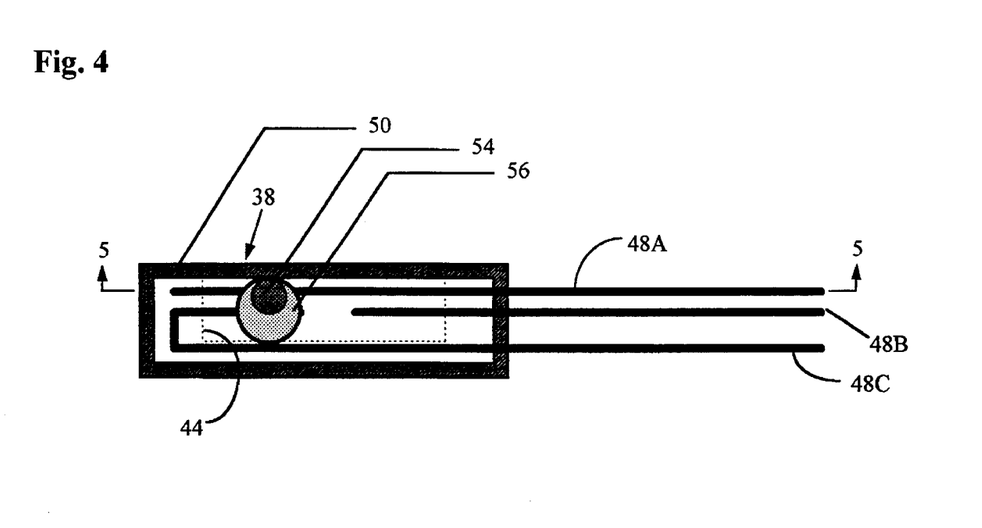
FIG. 4 is a plan view of the slide switch according to the present invention with the actuator knob removed to show underlying parts.
Figure 5:
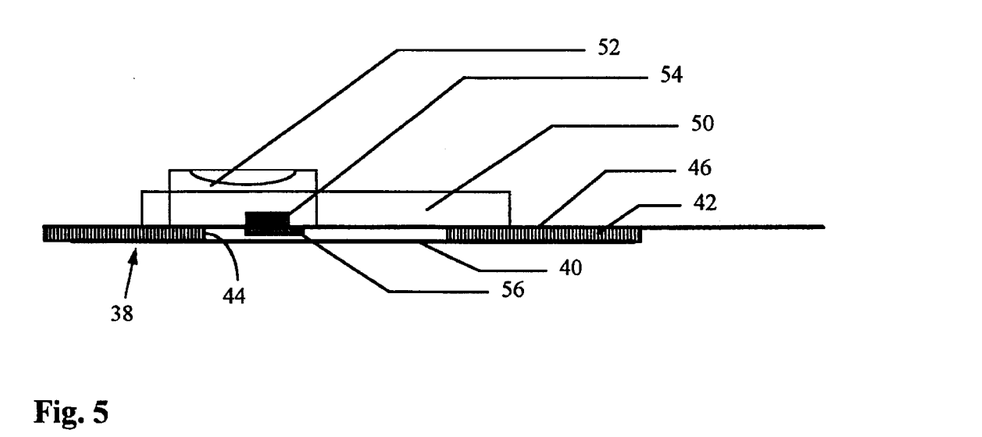
FIG. 5 is a section taken along line 5—5 of FIG. 4.

FIGS. 4 and 5 illustrate a slide switch 38. It has a substrate 40, a spacer 42 with an opening 44, and a carrier in the form of a membrane 46, all similar to the rotary switch 10. The opening 44 is an elongated rectangle. The internal surface of the carrier or membrane 46 has electrodes or traces 48A, 48B and 48C formed thereon. Electrode 48A is a common electrode while the ends of 48B and 48C are spaced apart as shown. It will be understood that this electrode arrangement is for purposes of illustration only and many variations are possible.

A plastic housing 50 is mounted on the external surface of the membrane. The housing is generally a rectangular box with an elongated slot in the top which receives an actuator or knob 52. The actuator carries a coupler 54 which, in a preferred embodiment, is a magnet. An armature 56 is disposed in the opening 44. The armature may have the same disc-shape as in the rotary switch. Operation of the switch is similar to that of the rotary switch except the motion of the actuator 52 is linear instead of circular. The actuator carries the coupler 54 back and forth. Magnetic attraction between the coupler and armature causes the armature to move in conjunction with the coupler, connecting either trace 48B or 48C to trace 48A.

The slide switch could also have a digital gear for providing a detent as in the rotary switch. Also, it will be noted that in both the slide switch and the rotary switch the coupler magnet is placed off center relative to the armature. This is done intentionally to cause the armature to rotate as the actuator or knob is moved. This extends the life of the switch. While the offset coupler magnet is preferred, it is not necessary to arrange the magnet this way.

The electrodes shown in the first two embodiments define a switch. They could also be arranged to form a potentiometer. A potentiometer can be constructed by replacing the switch contacts with a resistor element to form either a rotary or slide potentiometer.

Figure 6:
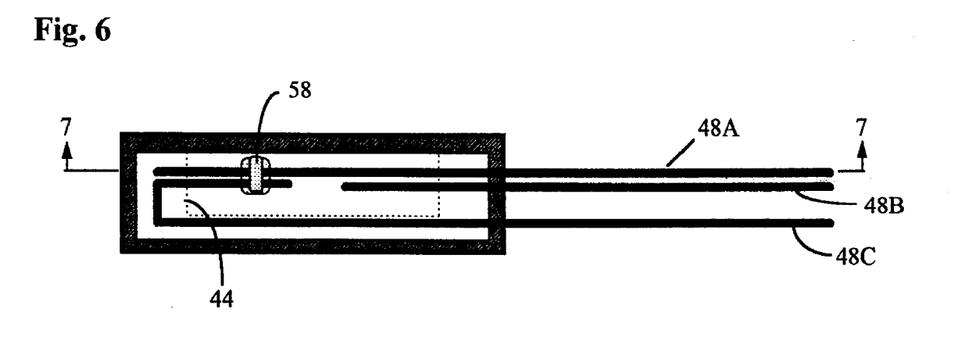
FIG. 6 plan view of a slide switch having an alternate armature.
Figure 7:
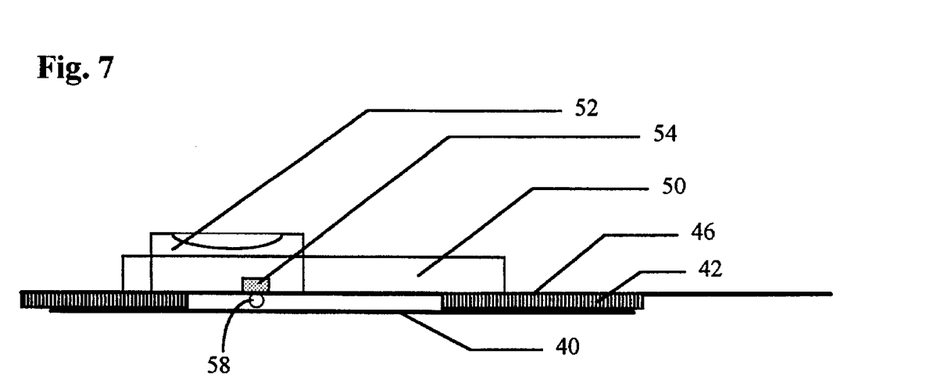
FIG. 7 is a section taken along line 7—7 of FIG. 6.

FIGS. 6 and 7 illustrate an alternate embodiment of the slide switch. This embodiment is similar to switch 38 except for the armature. A cylindrical armature 58 is substituted for the flat, disc-shaped armature. The cylindrical armature exhibits no hysteresis, i.e., when the direction of the actuator is reversed, the armature 58 tracks directly with no hesitation. The cylindrical armature also minimizes friction between the armature and the conductive traces.

Figure 8:
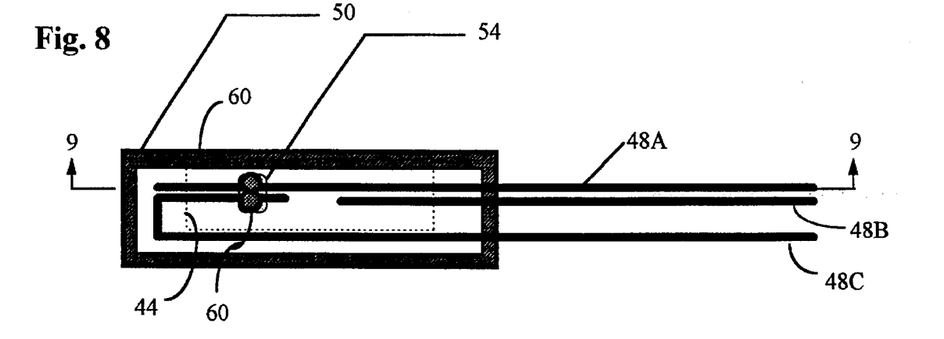
FIG. 8 plan view of a slide switch having a further alternate embodiment of an armature.
Figure 9:
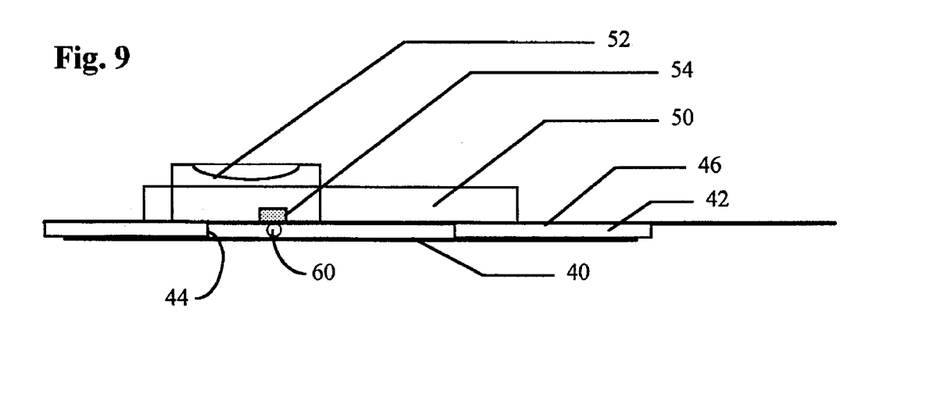
FIG. 9 is a section taken along line 9—9 of FIG. 8.
Figure 10:
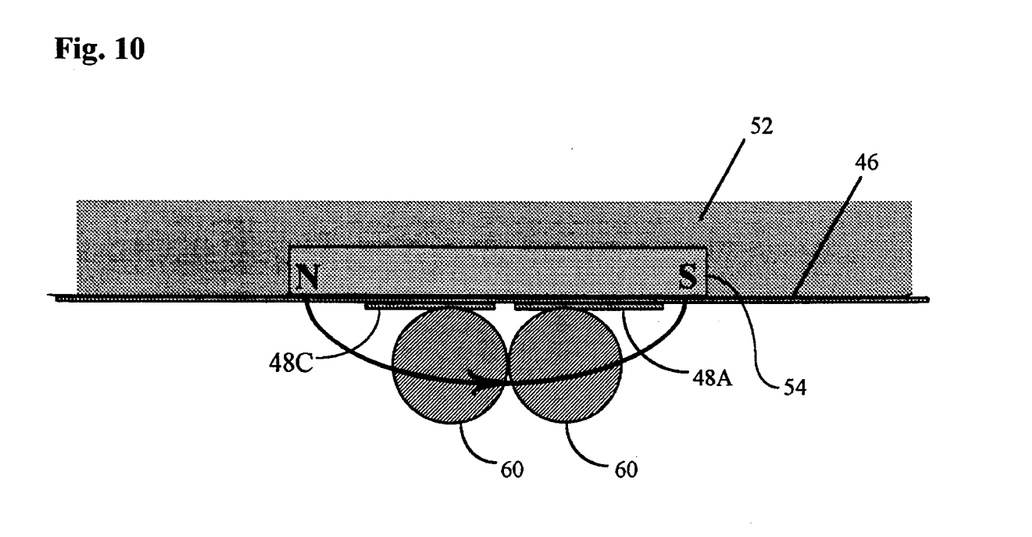
FIG. 10 is a greatly enlarged detail view of a switch having a spherical armature.

FIGS. 8–10 illustrate a further alternate embodiment of an armature. Here the armature is a pair of conductive balls 60. The balls have all the advantages of the cylindrical armature of FIGS. 6 and 7 plus the following. When the direction of the actuating mechanism is complex, i.e., any path other than straight or circular, the ball armature will track without either sliding or binding. This will allow for a complex actuating pattern such as the shifting pattern of a five-speed transmission. Accordingly, the ball armature configuration could be used in a rotary switch, a slide switch or something having a more complex actuating movement.

FIG. 10 also illustrates that in its simplest form, the switch of the present invention requires only a carrier with electrodes, a coupler and an armature. A spacer and substrate, while probably desirable in most applications to protect the armature and electrodes, are not absolutely necessary. Also, while the carrier is shown as the flexible polyester membrane of a traditional membrane switch, it could be otherwise. For example, a printed circuit board could serve as a carrier. Indeed, the carrier need not be a thin, planar sheet. Although this may be the most practical configuration for many applications, any carrier arrangement that transmits enough of the magnetic field so that the armature always tracks with the coupler will suffice.

Figure 11:
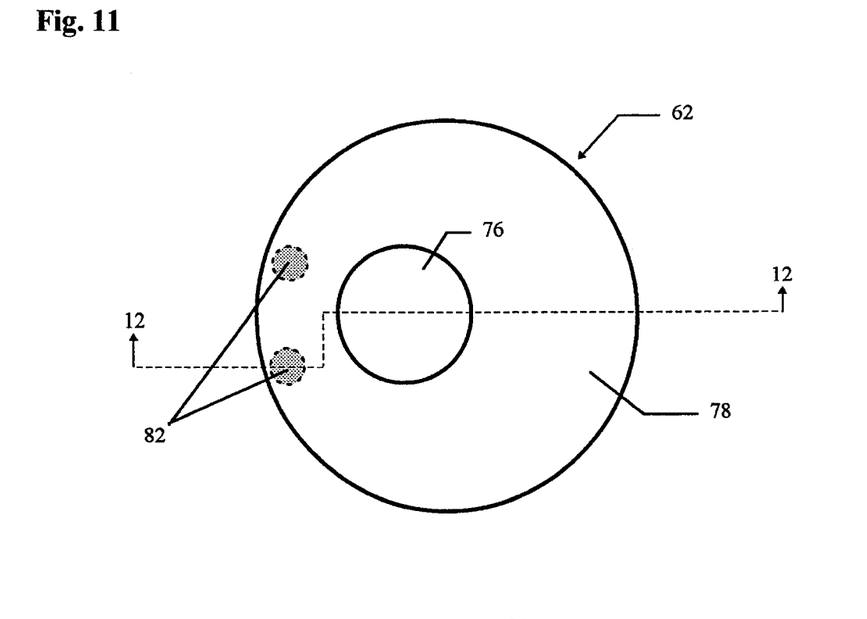
FIG. 11 is a plan view of a pushbutton switch according to the present invention.
Figure 12:
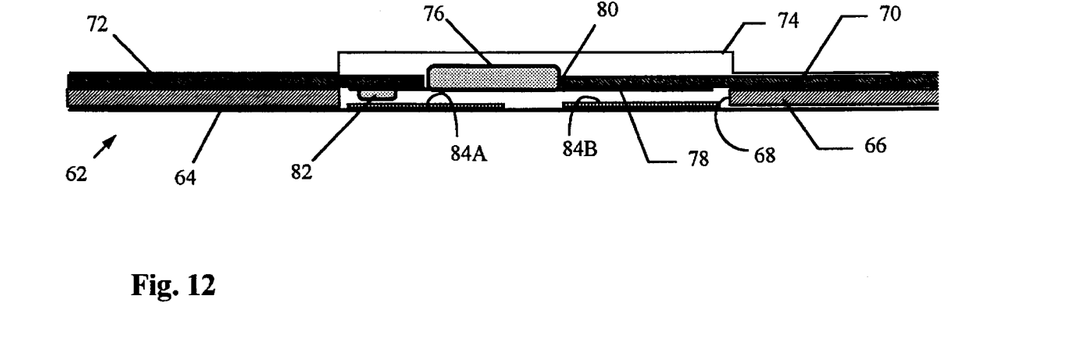
FIG. 12 is a section taken along line 12—12 of FIG. 11.

FIGS. 11 and 12 illustrate the pushbutton switch 62 according to the present invention. Starting from the bottom up, the switch 62 includes a substrate 64, a spacer 66 with an opening 68 therein, a layer 70 of a sheet magnet and a membrane 72. Alternately, the membrane could be deleted, although it is preferred to have a membrane to seal against dust, dirt and liquids as well as to provide a surface for graphics to be printed. The membrane is normally embossed as at 74 to provide space for the actuating button 76 formed on armature 78. This space could also be made by placing a second spacer in between the top surface of magnetic layer 70 and the underside of the membrane 72.

The armature 78 is located primarily within spacer opening 68. Its actuating button 76 protrudes through an aperture 80 in the magnetic layer 70. The lower surface of the armature has a fulcrum. In this case the fulcrum takes the form of a pair of extensions 82. The extensions are shown spaced from the electrode 84A but they could be in contact even when the switch is open. The armature is made of electrically conductive and magnetic material. The magnetic layer 70 holds the armature 78 up against the underside of the layer. Electrodes 84A, 84B are formed on the internal surface of the substrate.

To actuate the pushbutton switch 62 the user will press the actuating button 76. When the user does so pre-travel is achieved when the membrane is first deformed. As the membrane is further deformed the armature abruptly breaks away from the magnetic sheet material thus providing a very crisp tactile sensation. The fulcrum extensions 82 will snap loose from magnetic layer 70 and engage electrode 84A. Thereafter the armature will pivot about the fulcrum and into contact with the electrode 84B. This shorts the electrodes and closes the switch. Upon release of the closing pressure, the magnetic attraction between layer 70 and the armature 78 will return the armature to the position of FIG. 12, thereby reopening the switch. Since the button 78 extends through aperture 80, the magnetic layer 70 moves very little, if at all during closure.

Improved tactile feel can be achieved by placing a ferromagnetic material on the top surface of the magnet sheet layer 70. This material has the effect of directing the magnetic field downwardly toward the armature. This material further enhances the tactile sensation by providing rigidity to the magnetic sheet material. One example of such a material would be a thin soft steel sheet.

The pushbutton switch as shown and described can be afforded a custom tactile feel by changing the position and size of the actuating button. Increased switch travel and/or overtravel can be achieved by adjusting the geometry and size of the armature. Ultra-short switch travel can be achieved by adjusting the position of the actuating button. Stand-alone, individual, discrete switches can be fabricated. The magnetic return force allows switches to be held in the actuated position for extended periods without becoming permanently actuated. Backlighting can be achieved by providing a hole in the armature. High temperature manufacturing processes including wave soldering can be used with high temperature materials. A printed circuit board could be used as a substrate.

While a preferred form of the invention has been shown and described, it will be realized that alterations and modifications may be made thereto without departing from the scope of the following claims. For example, the positions of the magnet and armature could be reversed, i.e., the armature could be the magnet and the knob would carry a piece of magnetic material that would cause the magnet to follow the moving knob. Multiple carrier layers could be incorporated into a stackable switch actuated by a common knob. More than one coupler magnet could be provided to slide two or more armatures in association with one carrier.

What is claimed is:

1. An electrical switch, comprising:

a carrier having first and second surfaces;

a set of electrodes disposed on one of said carrier surfaces and defining at least one pair of spaced switch contacts;

an actuator for selectively opening or closing the switch contacts, the actuator comprising an electrically conductive armature disposed on said one of the carrier surfaces, and a coupler movably mounted on the other of the carrier surfaces, one of the coupler and armature being a permanent magnet and the other being made of magnetic material such that the armature is normally held in sliding engagement with said one surface of the carrier by the magnetic attraction between the coupler and armature, movement of the coupler causing corresponding movement of the armature into and out of shorting relation with the switch contacts.

2. The switch of claim 1 wherein the coupler is mounted for linear, sliding movement adjacent said other surface of the carrier.

3. The switch of claim 1 wherein the coupler is mounted for rotary movement adjacent said other surface of the carrier.

4. The switch of claim 1 wherein the actuator further comprises a knob mounted for movement adjacent the other of said carrier surfaces, the coupler being connected to the knob for movement therewith adjacent said other surface of the carrier.

5. The switch of claim 4 further comprising a housing mounted on the other surface of the carrier and defining a slot in which the knob slides.

6. The switch of claim 4 further comprising a shaft connected to the carrier, the shaft mounting the knob for rotation.

7. The switch of claim 1 further comprising a substrate layer and a spacer sandwiched between the carrier and the substrate layer, the spacer having at least one opening therein, the switch contacts and coupler being disposed in the spacer opening.

8. The switch of claim 7 wherein the actuator further comprises:

a knob mounted for movement adjacent the other of said carrier surfaces, the coupler being connected to the knob for movement therewith adjacent said other surface of the carrier; and a shaft connected to the carrier, the shaft mounting the knob for rotation and being sealed by a seal ring disposed in the spacer opening.

9. The switch of claim 7 wherein the coupler is mounted for linear, sliding movement adjacent said other surface of the carrier and the spacer opening is rectangular.

10. The switch of claim 1 wherein the armature is cylindrical with its axis parallel to the plane of the carrier.

11. The switch of claim 1 wherein the armature comprises a pair of balls.

12. The switch of claim 1 wherein the armature is disc-shaped and the coupler is offset from the axis of the armature such that movement of the coupler causes rotation of the armature during its movement.

13. The switch of claim 1 further comprising a detent means fixed to the switch for defining a desired actuator position.

14. The switch of claim 13 wherein the detent means comprises at least one cog of magnetic material located adjacent the magnetized one of the coupler or armature when the coupler is in the desired position.

15. In a switch of the type having a spacer sandwiched between a membrane layer and a substrate layer, the membrane and substrate layers each defining internal surfaces contacting the spacer and external surfaces on their opposite sides, the spacer having at least one opening therein, and at least one set of spaced electrodes disposed on the internal surface of the membrane in the area of the spacer opening to define switch contacts, the improvement comprising an actuator for selectively opening or closing the switch contacts, the actuator comprising:

a knob mounted for movement adjacent the external surface of the membrane;

a coupler connected to the knob for movement therewith adjacent the external surface of the membrane, at least a portion of the coupler's movement being aligned with the spacer opening; and an electrically conductive armature disposed in the spacer opening between the membrane and substrate, one of the coupler and armature being a permanent magnet and the other being made of magnetic material such that the armature is normally held in sliding engagement with the internal surface of the membrane by the magnetic attraction between the coupler and armature, movement of the knob and coupler causing corresponding movement of the armature, thereby moving the armature into and out of shorting relation with the electrodes.

16. In a switch of the type having a spacer on top of a substrate layer, the substrate layer defining an internal surface contacting the spacer, the spacer having at least one opening therein, and at least one set of spaced electrodes disposed on the internal surface of the substrate in the area of the spacer opening to define switch contacts, the improvement comprising an actuator for selectively opening or closing the switch contacts, the actuator comprising an electrically conductive armature disposed in the spacer opening, and a coupler fixedly mounted on the surface of the spacer opposite the substrate with the armature between the coupler and the electrodes, one of the coupler and armature being a permanent magnet and the other being made of magnetic material such that the armature is normally held spaced from the internal surface of the substrate by the magnetic attraction between the coupler and armature, depression of the coupler in the area of the spacer opening causing movement of the armature into shorting relation with the electrodes, the magnetic attraction causing retraction of the armature to its normal spaced relation from the electrodes.

17. The switch of claim 16 wherein the armature includes a fulcrum extending therefrom and facing the electrodes such that the fulcrum contacts the substrate first and thereafter the armature pivots about the fulcrum during a closing movement.

18. The switch of claim 16 wherein the armature further includes a button extending through a coupler opening.

19. The switch of claim 16 further comprising a membrane layer on top of the coupler.

20. The switch of claim 19 wherein the external surface of the membrane is embossed in the area of the spacer opening.

* * * * *

(12) REEXAMINATION CERTIFICATE (4520th)

United States Patent
Van Zeeland (10) Number: US 5,523,730 C1
(45) Certificate Issued: Jan. 15, 2002

(54) SWITCH WITH MANGNETICALLY-COUPLED ARMATURE

(75) Inventor: Anthony J. Van Zeeland, 2140 S. Rogers, Mesa, AZ (US) 85202

(73) Assignee: Anthony J. Van Zeeland, Mesa, AZ (US)

Reexamination Request:
No. 90/005,164, Nov. 16, 1998

Reexamination Certificate for:
Patent No.: 5,523,730
Issued: Jun. 4, 1996
Appl. No.: 08/458,989
Filed: Jun. 2, 1995

(51) Int. Cl.$^7$ .................................. H01H 9/00
(52) U.S. Cl. .................. 335/205; 335/177; 335/207
(58) Field of Search .................... 335/177–179, 335/205–207; 200/510–521, 600

(56) References Cited

U.S. PATENT DOCUMENTS

| | | | |
|---|---|---|---|
| 2,410,746 A | 11/1946 | Raettig | 335/205 |
| 3,716,812 A * | 2/1973 | Greve et al. | 335/179 |
| 3,735,300 A | 5/1973 | Benner et al. | 335/206 |
| 3,859,612 A | 1/1975 | Kashio | 335/205 |
| 3,879,602 A | 4/1975 | Walker | 235/145 R |
| 4,068,202 A | 1/1978 | Lyons, IIi | 335/207 |
| 4,101,857 A | 7/1978 | O'Toole | 335/206 |
| 4,199,741 A | 4/1980 | Serrus Paulet | 335/206 |
| 4,203,013 A | 5/1980 | Serrus Paulet | 200/5 A |
| 4,370,631 A | 1/1983 | Gerber et al. | 333/106 |
| 4,389,627 A | 6/1983 | Uesugi et al. | 335/206 |
| 4,400,594 A | 8/1983 | Serras-Paulet | 200/5 A |
| 4,603,309 A | 7/1986 | Renken | 333/101 |
| 5,144,274 A | 9/1992 | Masaki | 338/12 |
| 5,268,660 A | 12/1993 | Cappelli | 335/4 |
| 5,313,027 A | 5/1994 | Inoue et al. | 200/5 A |
| 5,365,155 A | 11/1994 | Zimmermann | 318/268 |
| 5,523,730 A | 6/1996 | Van Zeeland | 335/205 |
| 5,666,096 A | 9/1997 | Van Zeeland | 335/4 |

FOREIGN PATENT DOCUMENTS

| | | |
|---|---|---|
| DE | 1144368 | 2/1959 |
| DE | 1055646 | 4/1959 |
| DE | 3408599 | 9/1985 |
| DE | G90 03 955.6 | 7/1990 |
| FR | 1329674 | 5/1963 |

\* cited by examiner

*Primary Examiner*—Lincoln Donovan (57) ABSTRACT

A switch has a carrier sheet with electrodes formed on an internal side thereof to form switch contacts. An armature is held in slidable contact with the internal side of the carrier and the electrodes by a magnet disposed on the external surfacce of the carrier. The magnet is carried in a knob mounted on the external side of the membrane carrier for rotary, linear or complex motion. When a user manipulates the knob the magnet drags the armature either into or out of shorting relation with the electrodes. A magnetic detent gear can be incorporated to provide tactile feedback. A pushbutton version of the switch can be made with a pivotable armature normally held spaced from electrodes on the substrate by a magnet. A membrane and spacer may be added to protect and seal the electrodes and armature.

Amended

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

THE DRAWING FIGURES HAVE BEEN CHANGED AS FOLLOWS:

Fig. 1: shading and ref Nos 23 & 25 added. Fig. 4: ref No 46 added. Fig. 5: ref No 48a added. Fig. 6:ref Nos. 46 & 54 added. Fig. 7: ref No 48a added Fig 8: ref No. 46 added. Fig 9: ref NO. 48a added.

AS A RESULT OF REEXAMINATION, IT HAS BEEN DETERMINED THAT:

The patentability of claims 15–20 is confirmed.

Claims 10 and 11 are cancelled.

Claim 1 is amended.

Claims 2–9 and 12–14, dependent on an amended claim, are determined to be patentable.

New claims 21–45 are added and determined to be patentable.

1. An electrical switch, comprising:
   a carrier having first and second surfaces;
   a set of electrodes disposed on one of said carrier surfaces and defining at least one pair of spaced switch contacts;
   an actuator for selectively opening or closing the switch contacts, the actuator comprising an electrically conductive armature disposed on said one of the carrier surfaces, and a coupler movably mounted on the other of the carrier surfaces, one of the coupler and armature being a permanent magnet and the other being made of magnetic material such that the armature is normally held in sliding engagement with said one surface of the carrier by the magnetic attraction between the coupler and armature, movement of the coupler causing corresponding movement of the armature into and out of shorting relation with the switch contacts, *the armature having a fixed contact area which always remains in contact with one or both of said one surface of the carrier and the switch contacts.*

21. *An electrical switch, comprising:*
    *a carrier having first and second surfaces;*
    *a set of electrodes disposed on one of said carrier surfaces and defining at least one pair of spaced switch contacts;*
    *an actuator for selectively opening or closing the switch contacts, the actuator comprising an electrically conductive armature disposed on said one of the carrier surfaces, and a coupler movably mounted on the other of the carrier surfaces, one of the coupler and armature being a permanent magnet and the other being made of magnetic material such that the armature is normally held in rotatable engagement with said one surface of the carrier by the magnetic attraction between the coupler and armature, movement of the coupler causing corresponding movement of the armature into and out of shorting relation with the switch contacts, the armature having at least first and second elements in contact with each other and with one or both of said one of said carrier surfaces and the switch contacts.*

22. *The switch of claim 21 wherein the coupler is mounted for linear, sliding movement adjacent said other surface of the carrier.*

23. *The switch of claim 21 wherein the coupler is mounted for rotary movement adjacent said other surface of the carrier.*

24. *The switch of claim 21 wherein the actuator further comprises a knob mounted for movement adjacent the other of said carrier surfaces, the coupler being connected to the knob for movement therewith adjacent said other surface of the carrier.*

25. *The switch of claim 24 further comprising a housing mounted on the other surface of the carrier and defining a slot in which the knob slides.*

26. *The switch of claim 24 further comprising a shaft connected to the carrier, the shaft mounting the knob for rotation.*

27. *The switch of claim 21 further comprising a substrate layer and a spacer sandwiched between the carrier and the substrate layer, the spacer having at least one opening therein, the switch contacts and coupler being disposed in the spacer opening.*

28. *The switch of claim 27 wherein the actuator further comprises;*
    *a knob mounted for movement adjacent the other of said carrier surfaces, the coupler being connected to the knob for movement therewith adjacent said other surface of the carrier; and*
    *a shaft connected to the carrier, the shaft mounting the knob for rotation and being sealed by a seal ring disposed in the spacer opening.*

29. *The switch of claim 27 wherein the coupler is mounted for linear, sliding movement adjacent said other surface of the carrier and the spacer opening is rectangular.*

30. *The switch of claim 21 wherein the armature comprises a pair of balls.*

31. *The switch of claim 21 further comprising a detent means fixed to the switch for defining a desired actuator position.*

32. *The switch of claim 31 where the detent means comprises at least one cog of magnetic material located adjacent the magnetized one of the coupler or armature when the coupler is in the desired position.*

33. *An electrical switch, comprising:*
    *a carrier having first and second surfaces;*
    *a set of electrodes disposed on one of said carrier surfaces and defining at least one pair of spaced switch contacts;*
    *an actuator for selectively opening or closing the switch contacts, the actuator comprising an electricllay conductive armature disposed on said one of the carrier surfaces, and a coupler movably mounted on the other of the carrier surfaces, one of the coupler and armature being a permanent magnet and the other being made of magnetic material such that the armature is normally held in rotatable engagement with said one surface of the carrier by the magnetic attraction between the coupler and armature, movement of the coupler causing corresponding movement of the armature into and out of shorting relation with the switch contacts, the armature comprising at least two balls in contact with each other.*

34. The switch of claim 33 wherein the coupler is mounted for linear, sliding movement adjacent said other surface of the carrier.

35. The switch of claim 33 wherein the coupler is mounted for rotary movement adjacent said other surface of the carrier.

36. The switch of claim 33 wherein the actuator further comprises a knob mounted for movement adjacent the other of said carrier surfaces, the coupler being connected to the knob for movement therewith adjacent said other surface of the carrier.

37. The switch of claim 36 further comprising a housing mounted on the other surface of the carrier and defining a slot in which the knob slides.

38. The switch of claim 36 further comprising a shaft connected to the carrier, the shaft mounting the knob for rotation.

39. The switch of claim 33 further comprising a substrate layer and a spacer sandwiched between the carrier and the substrate layer, the spacer having at least one opening therein, the switch contacts and coupler being disposed in the spacer opening.

40. The switch of claim 39 wherein the actuator further comprises:

a knob mounted for movement adjacent the other of said carrier surfaces, the coupler being connected to the knob for movement therewith adjacent said other surface of the carrier; and a shaft connected to the carrier, the shaft mounting the knob for rotation and being sealed by a seal ring disposed in the spacer opening.

41. The switch of claim 39 wherein the coupler is mounted for linear, sliding movement adjacent said other surface of the carrier and the spacer opening is rectangular.

42. The switch of claim 33 wherein the armature comprises a pair of balls.

43. The switch of claim 33 further comprising a detent means fixed to the switch for defining a desired actuator position.

44. The switch of claim 43 wherein the detent means comprises at least one cog of magnetic material located adjacent the magnetized one of the coupler or armature when the coupler is in the desired position.

45. In a switch of the type having a spacer sandwiched between a membrane layer and a substrate layer, the membrane and substrate layers each defining internal surfaces contacting the spacer and external surfaces on their opposite sides, the spacer having at least one opening therein, and at least one set of spaced electrodes disposed on the internal surface of the membrane in the area of the spacer opening to define switch contacts, the improvement comprising an actuator for selectively opening or closing the switch contacts, the actuator comprising:

a knob mounted for movement adjacent the external surface of the membrane;

a coupler connected to the knob for movement therewith adjacent the external surface of the membrane, at least a portion of the coupler's movement being aligned with the spacer opening; and an electrically conductive armature disposed in the spacer opening between the membrane and substrate, one of the coupler and armature being a permanent magnet and the other being made of magnetic material such that the armature is normally held in rotatable engagement with the internal surface of the membrane by the magnetic attraction between the coupler and armature, movement of the knob and coupler causing corresponding movement of the armature, thereby moving the armature into and out of shorting relation with the electrodes.

* * * * *